United States Patent
Sanglier et al.

(10) Patent No.: US 12,217,209 B2
(45) Date of Patent: Feb. 4, 2025

(54) ARTICLE TRACKING SYSTEM AND METHOD

(71) Applicant: Sita Information Networking Computing USA, Inc., Atlanta, GA (US)

(72) Inventors: Adrien Sanglier, Geneva (CH); Andrew Eric Malinofsky, Atlanta, GA (US)

(73) Assignee: SITA Information Networking Computing USA, Inc., Atlanta, GA (US)

(*) Notice: Subject to any disclaimer, the term of this patent is extended or adjusted under 35 U.S.C. 154(b) by 573 days.

(21) Appl. No.: 16/955,631

(22) PCT Filed: Dec. 18, 2018

(86) PCT No.: PCT/IB2018/060284
§ 371 (c)(1),
(2) Date: Jun. 18, 2020

(87) PCT Pub. No.: WO2019/123274
PCT Pub. Date: Jun. 27, 2019

(65) Prior Publication Data
US 2020/0387861 A1 Dec. 10, 2020

Related U.S. Application Data

(60) Provisional application No. 62/609,385, filed on Dec. 22, 2017.

(51) Int. Cl.
*G06Q 10/0833* (2023.01)

(52) U.S. Cl.
CPC ................. *G06Q 10/0833* (2013.01)

(58) Field of Classification Search
CPC .................................. G06Q 10/0833
See application file for complete search history.

(56) References Cited

U.S. PATENT DOCUMENTS 9,710,776 B1    7/2017  Lewandowski
2003/0126109 A1*  7/2003  Couch ............... G06F 16/258
(Continued)

FOREIGN PATENT DOCUMENTS

EP         3113090 A1    1/2017

OTHER PUBLICATIONS

Mo Li, OTrack: Order tracking for luggage in mobile RFID systems, 2013, p. 3066-3069 (Year: 2013).*
(Continued)

*Primary Examiner* — Ibrahim N El-Bathy
(74) *Attorney, Agent, or Firm* — Morris, Manning & Martin, LLP; Daniel E. Sineway, Esq.; Adam J. Thompson, Esq.

(57) ABSTRACT

An article tracking system and method are provided. The system includes an article identifier, a location identifier, a mobile application stored on a mobile device, and a cloud platform. The mobile application combines article information from the article identifier and location information from the location identifier into a data packet and transmits the data packet to the cloud platform for storage. Creating and sending a data packet for each of a plurality of locations enables to system to record the location history of the article over time.

19 Claims, 14 Drawing Sheets

(56) References Cited

U.S. PATENT DOCUMENTS

| | | | | |
|---|---|---|---|---|
| 2006/0091206 | A1* | 5/2006 | Olsen | G06Q 10/08 |
| | | | | 235/384 |
| 2011/0241294 | A1 | 10/2011 | Guldenaar | |
| 2013/0265155 | A1* | 10/2013 | Wible | G06Q 10/08 |
| | | | | 340/539.13 |
| 2013/0290459 | A1* | 10/2013 | Cuff | H04L 51/226 |
| | | | | 709/207 |
| 2014/0143202 | A1* | 5/2014 | Rekula | G06Q 10/107 |
| | | | | 707/610 |
| 2014/0258165 | A1* | 9/2014 | Heil | G06Q 10/0833 |
| | | | | 235/494 |
| 2016/0314429 | A1* | 10/2016 | Gillen | G06Q 10/0833 |
| 2017/0004444 | A1* | 1/2017 | Krasko | G06Q 10/0833 |
| 2017/0344010 | A1* | 11/2017 | Rander | G05D 1/0217 |
| 2018/0240067 | A1* | 8/2018 | Oz | G07C 9/00182 |
| 2019/0166121 | A1* | 5/2019 | Colby | H04L 67/563 |

OTHER PUBLICATIONS

International Search Report issued in International Application No. PCT/IB2018/060284, mailed Apr. 3, 2019 (3 pages).
Written Opinion of the International Searching Authority, Issued in International Application No. PCT/IB2018/060284, mailed Apr. 3, 2019 (6 pages).
Examination Report issued in International Application No. GB1801837.4, dated Aug. 10, 2022 (6 pages).
International Preliminary Report on Patentability for International Application No. PCT/IB2018/060284, mailed Jul. 2, 2020, 8 Pages.

* cited by examiner

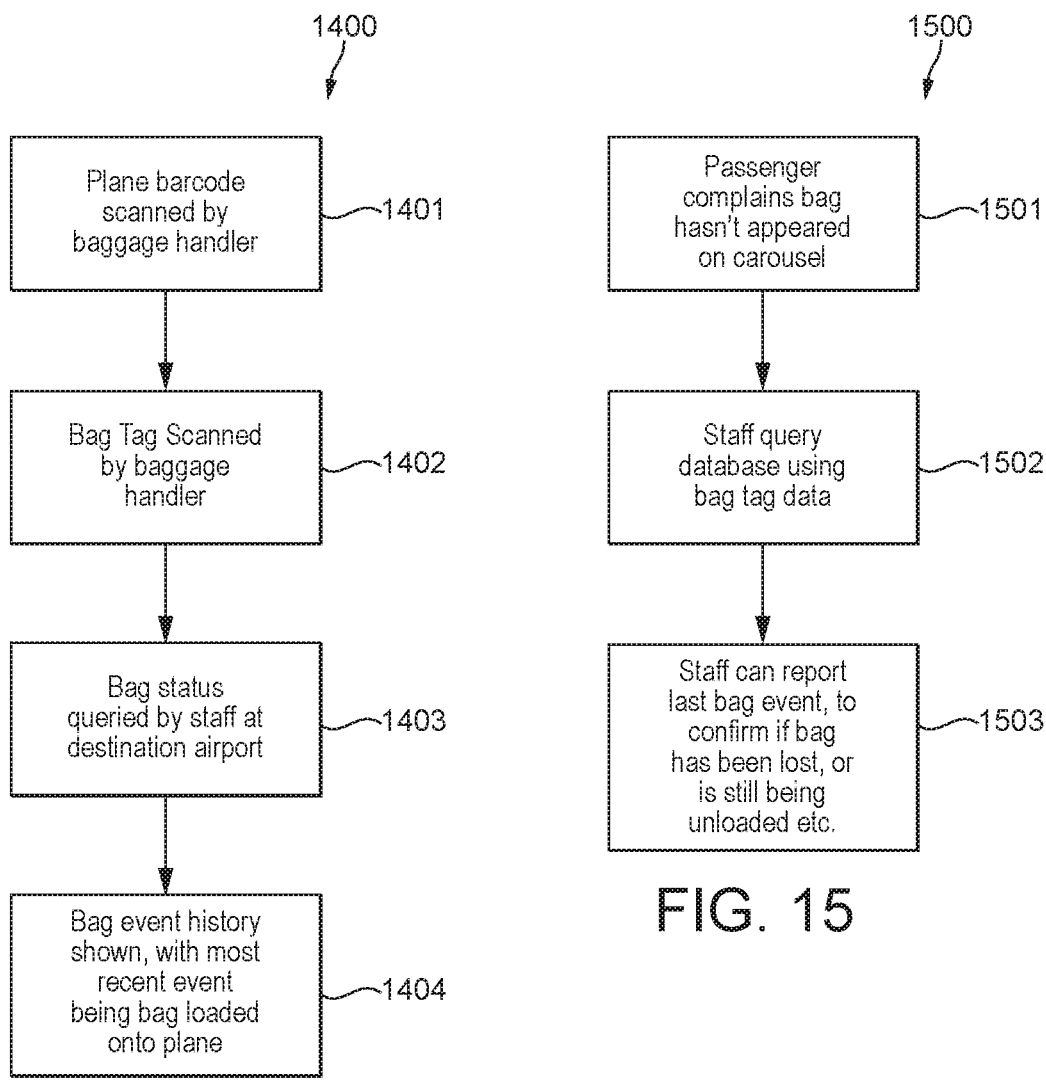

ARTICLE TRACKING SYSTEM AND METHOD

CROSS-REFERENCE TO RELATED APPLICATIONS

This application is a National Stage application of, and claims the benefit of and priority to, International Patent Application No. PCT/IB2018/060284, filed Dec. 18, 2018, entitled "ARTICLE TRACKING SYSTEM AND METHOD," which claims priority to U.S. Provisional Patent Application No. 62/609,385, Dec. 22, 2017, and entitled "ARTICLE TRACKING SYSTEM AND METHOD," all of which are incorporated by reference in their entireties herein.

FIELD OF INVENTION

This invention relates to systems and methods of tracking an article using a mobile application.

BACKGROUND TO THE INVENTION

The airline industry has strict regulations which require the effective tracking and management of baggage. Current bag tracking systems use the Baggage Information Message (BIM) data format to track an article of baggage during a journey. Complex and expensive computer systems and networks use laser-scanned 1d barcode paper tags to generate and send BIM messages to back-end baggage handling systems as the bag makes its way through its journey. All of this is done to ensure that a bag is properly routed through an airport sortation system, placed in a proper container, loaded on the correct aircraft, and eventually deposited on the correct carousel at the correct destination airport.

Although these systems have provided excellent success rates of baggage delivery, such systems are complex and expensive to purchase and operate. This has resulted in baggage tracking only being available in large airports, or via expensive proprietary solutions for specific airlines. Additionally, BIM messages are teletype based, cryptic in content, inflexible and require a minimum level of information per message that is obtained through integration with additional complex systems.

For these reasons, only larger airports, with a high volume of passengers per year and an established airline customer base, tend to have the resources for the most comprehensive tracking coverage. Conversely, smaller airports have limited infrastructure for providing the required level of baggage tracking automation.

Being unable to track a bag throughout a journey results in "holes" in the baggage tracking ecosystem. This makes it more difficult to manage irregular baggage situations and can cause airlines to lose revenue due to the cost of locating and repatriating lost bags, as well as creating negative relationships between passengers and airlines, and between airlines and airports.

The invention aims to address and ameliorate the problems discussed above.

SUMMARY OF THE INVENTION

The invention is defined by the claims, to which attention is now drawn.

In a first aspect of the invention, an article tracking system using a mobile device comprises an article identifier for providing electronically readable article information associated with an article, the article information including a unique article identity, a location identifier for providing location information related to the current location of the article, a mobile application stored on the mobile device, the mobile application configured to generate a message by combining the article information with the location information, apply a timestamp to the message, and transmit the timestamped message via a transmitter of the mobile device, and a tracking database configured to receive and store a plurality of timestamped messages, thereby to record multiple locations of the article over time.

Embodiments of the invention may have the advantage of providing a low cost and robust tracking system for environments having limited infrastructure or resources. Embodiments of the invention avoid the need for high cost tracking equipment.

An embodiment of the invention further comprises a cloud platform including the tracking database for storing the timestamped message at a remote location. This has the advantage of providing the tracking database at a location removed from the rest of the tracking system.

An embodiment of the invention further comprises a data processor configured to retrieve user information associated with a user from one or more external systems. This has the advantage of making use of existing user information, which reduces the amount of data needed to be gathered by the article tracking system.

In an embodiment of the invention, the user information associated with a user is manually input. This has the advantage of providing user information to the tracking system when there is no existing user information.

In another embodiment of the invention, the user information includes the unique article identity of an article associated with the user. This has the advantage of enabling the tracking system to match user information to tracking messages.

In another embodiment of the invention, the data processor uses the unique article identity to enrich the message with the retrieved user information.

An embodiment of the invention further comprises a transform service configured to transform the message into the same format as the user information. This has the advantage of enabling the tracking system to be compatible with external systems which provide the user information.

In an embodiment of the invention, the article is a baggage article.

In an embodiment of the invention, the article identifier is a bag tag, an RFID or a BLE beacon. This has the advantage of efficiently providing article information to the tracking system.

In an embodiment of the invention, the location identifier is a bar code or a GPS module. This has the advantage of efficiently providing location information to the tracking system.

In an embodiment of the invention, the mobile application requests the current location to be manually input. This has the advantage of providing location information to the tracking system when this information cannot be retrieved otherwise.

In an embodiment of the invention, the location information includes a unique location identity. This has the advantage of enabling the tracking system to uniquely identify a particular location from the location identity.

In an embodiment of the invention, the location information includes a location code, a location text descriptor, or GPS/latitude and longitude coordinates.

In an embodiment of the invention, the user information includes passenger related data retrieved from a passenger name record database. This has the advantage of enabling the tracking system to be used in the transport sector.

In an embodiment of the invention, the message is transmitted via WiFi, 3G, LTE or any other wireless connectivity means. This has the advantage of enabling a user of the tracking system to work wirelessly.

In an embodiment of the invention, the message is an API payload.

In a further embodiment of the invention, the API payload is a lightweight baggage information message.

In a further embodiment of the invention, the API payload is in JavaScript Object Notation message format.

In an embodiment of the invention, the transform service transforms the message into teletype message format. This has the advantage of enabling the tracking system to operate with external systems using teletype messages.

In a second aspect of the invention, an article tracking method using a mobile device comprises the steps of associating an article identifier with an article, obtaining, via a mobile application stored on the mobile device, electronically readable article information including a unique article identity from the article identifier, obtaining location information related to the current location of the article from a location identifier, generating a message by combining, via the mobile application, the article information and location information, applying a timestamp to the message, transmitting the timestamped message via a transmitter of the mobile device, receiving and storing the timestamped message at a tracking database, and repeating the above steps for a plurality of locations, thereby to record multiple locations of the article over time.

The advantages of the first aspect of the invention described above also apply to the second aspect of the invention.

In an embodiment of the invention, a cloud platform including the tracking database receives and stores the timestamped message at a remote location.

In a further embodiment of the invention, the cloud platform retrieves user information associated with a user from one or more external systems via a data processor.

In an embodiment of the invention, user information associated with a user is manually input.

In an embodiment of the invention, the user information includes the unique article identity of an article associated with the user.

In an embodiment of the invention, the data processor uses the unique article identity to enrich the message with the retrieved user information.

In an embodiment of the invention, the cloud platform transforms the message into the same format as the user information with a transform service.

In an embodiment of the invention the article is a baggage article.

In an embodiment of the invention, the article identifier is a bag tag, an RFID or a BLE beacon In an embodiment of the invention, the location identifier is a bar code or a GPS module.

In an embodiment of the invention, the mobile application requests the current location to be manually input.

In an embodiment of the invention, the location information includes a unique location identity.

In a further embodiment of the invention, the location information includes a location code, a location text descriptor, or GPS/latitude and longitude coordinates.

In an embodiment of the invention, the user information includes passenger related data retrieved from a passenger name record database.

In an embodiment of the invention, the message is transmitted via WiFi, 3G, LTE or any other wireless connectivity means.

In an embodiment of the invention, the message is an API payload.

In an embodiment of the invention, the API payload is a lightweight baggage information message.

In a further embodiment of the invention, the API payload is in JavaScript Object Notation message format.

In an embodiment of the invention, the transform service transforms the message into teletype message format.

A third aspect of the invention provides an article tracking system using a mobile device comprising: an article identifier for providing electronically readable article information associated with an article, the article information including a unique article identity; a location identifier for providing location information related to the current location of the article at each of a plurality of locations; a mobile application stored on the mobile device, the mobile application configured to: a. generate a message by combining the article information with the location information related to a current location of the article at one or more of the plurality of locations; b. apply a timestamp to each of the generated messages; and c. transmit the timestamped messages via a transmitter of the mobile device; and a tracking database configured to receive and store the plurality of timestamped messages, thereby to record locations of the article over time.

The advantages of the first aspect of the invention described above also apply to the third aspect of the invention.

Embodiments of the invention have the advantage of providing baggage tracking solutions in airports with limited infrastructure. The limited existing infrastructure in these airports will typically be based on legacy systems and so embodiments of the invention are preferably compatible with legacy systems to advantageously avoid fragmentation of the technology.

Embodiments of the invention should preferably satisfy the tracking, sorting and reconciliation requirements of the air transport industry. Additionally, embodiments of the invention preferably have the advantage of being expandable and cost effective in order to effectively cover the whole journey made by a bag, which may include travel destinations outside of an airport, for example hotels, and car rental locations.

DETAILED DESCRIPTION

Embodiments of the invention will now be described, by way of example only, with reference to the accompanying drawings, in which:

FIG. 14 shows a first schematic flow diagram for a user obtaining tracking history of an article; and FIG. 15 shows a second schematic flow diagram for a user obtaining tracking history of an article.

Figure 1:
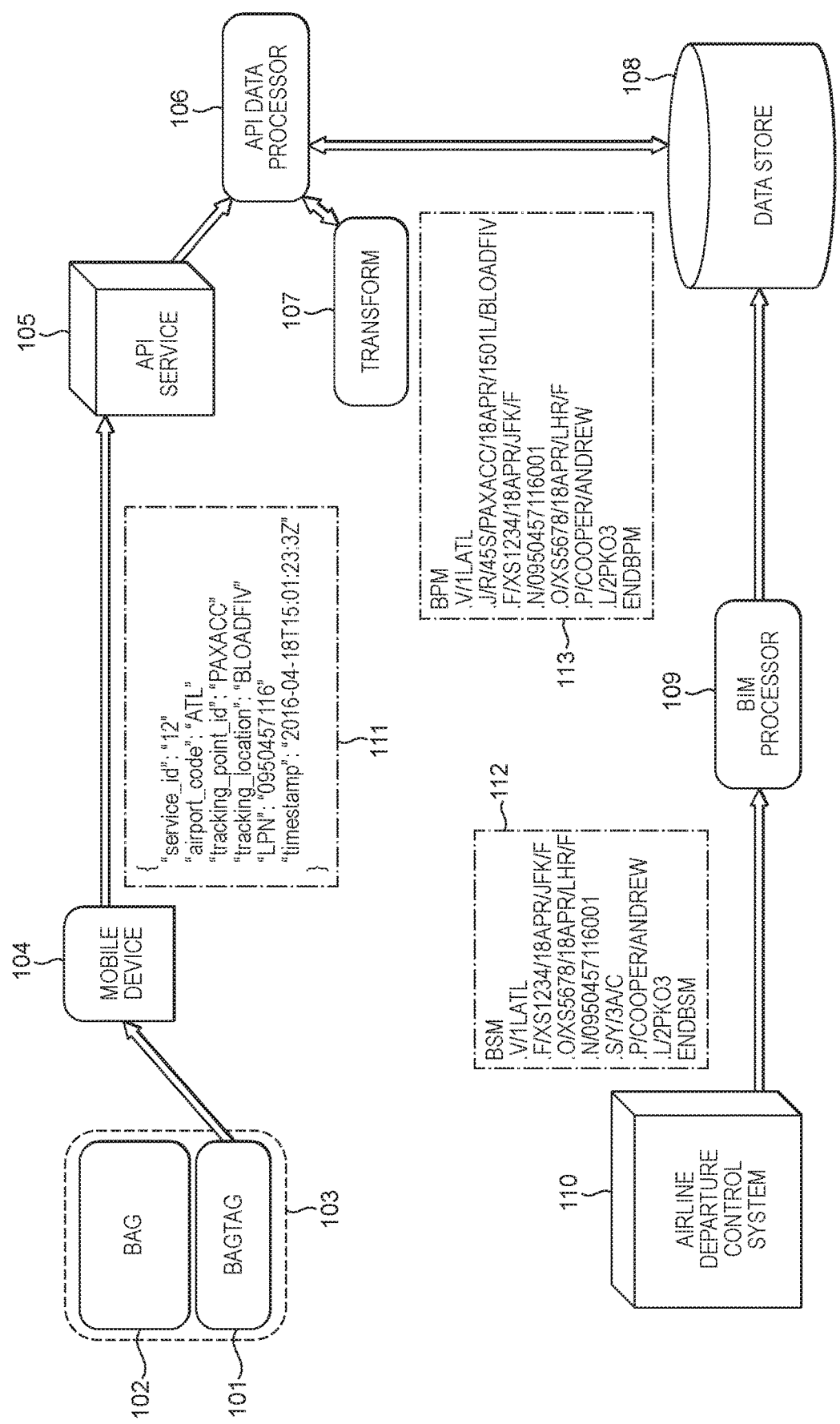
FIG. 1 shows a schematic diagram of a mobile tracking system embodying the invention.

Embodiments of the invention described below relate to baggage tracking within the airline and other transportation industries. However, the invention is related generally to tracking an article in any large venue, including, but not limited to, shopping centres, sports stadia, commercial premises, academic institutions and performance venues.

Presently, bags are tracked in the airline industry using 1-d laser barcode scanners and Baggage Information Messages (BIMs), which are sent between departure control systems and automated baggage handling systems. The BIMs are sent, received and processed by the airport departure and baggage handling systems in order to achieve automated baggage sortation, passenger and baggage reconciliation, and other baggage services.

Bag information included in the BIMs is linked with a 10-digit bag tag number defined as the License Plate Number (LPN). This 10 digit LPN is issued during check-in and is used to create a unique reference to a specific bag. The airport systems receive this 10 digit LPN in a baggage message and store the LPN for use as a reference when communicating to other airport systems. The LPN is represented on the 1-d laser barcode issued for a checked bag.

There are several different types of Baggage Information Messages, including Baggage Source Messages (BSMs) and Baggage Processed Messages (BPMs).

The BSM provides information for processing baggage by automated baggage systems. For example, a BSM will be generated by an airline Departure Control System when a passenger checks in a bag for a journey, when a bag must be transferred to a different flight, and when a bag has been mishandled.

An example of a BSM in teletype format is shown below. Data contained within the BSM may be sourced from baggage handling systems, or other systems storing passenger information.

| MESSAGE CODE LINE | MESSAGE LINE DESCRIPTION |
| --- | --- |
| BSM<= | Standard Message Identifier |
| .V/1LZRH<= | Version 1; Local baggage at Zurich Airport (ZRH) |
| .F/BA101/18APR/JFK/F<= | Outbound carrier and flight; Date; Destination; Class |
| .N/012523456003<= | LPN—IATA airline code; Baggage number (underlined); Number of consecutive tags |
| ENDBSM<= | End of Message Identifier |

In the above example the second line, which begins .V, defines the current location of the bag, Zurich, and indicates the bag has originated there.

The third line, which begins .F, defines the itinerary. In this case, a bag has been checked onto British Airways flight number BA101 to JFK International Airport on 18 April and belongs to a first class passenger. Itinerary data is mandatory in BSMs for originating baggage, as in the above example, and transfer baggage. It is not included for a bag which has reached its terminating location.

In the fourth line, .N indicates the baggage LPN and the number of checked in bags belonging to the same traveller. The 1st digit is a leading digit which may be used by individual airlines to aid baggage identification. The 2nd to 4th digits (085) define a 3-digit IATA airline code. For example, 006 indicates Delta Airlines and 125, the example here, indicates British Airways. The 5th to 10th digits (underlined above) define a 6-digit baggage number associated with the bag at check-in. The final 3 digits indicate that 3 bags were checked in by the passenger. Thus, 3 LPNs are associated with this passenger:

LPN #1=0125123456
LPN #2=0125123457
LPN #3=012523458.

The 6-digit baggage numbers are generated in sequential order and combined with a 3-digit IATA airline code and a customisable leading digit to create an LPN. Due to the large volume of passengers, airlines must reuse existing LPNs, and so a bag is uniquely identified by combining the date of travel with the ten digit LPN. Thus the LPN combined with the date of travel is an example of a unique baggage identity which is encoded in a bag tag which is an example of an article identifier.

BSMs are sent to provide information for processing of baggage by automated baggage systems. For example, a BSM may be sent when a bag tag is deleted, a bag is re-routed or a passenger's itinerary is changed.

BPMs are sent to communicate when a bag has been processed by a baggage handling system. For example, a BPM may be sent when the baggage handling system reports that a bag has missed a connection. BPMs come in two varieties: sortation messages and reconciliation messages. As before with BSMs, the data contained within a BPM may be sourced from baggage handling systems, or other systems storing passenger information.

BPM sortation messages are sent during various stages of the bag journey and enable baggage sortation systems to determine whether a bag has been correctly sorted. The sortation messages also include screening messages. Baggage screening systems are used by Transport Security Agents (TSAs) to check baggage, and a BPM is generated if the bag is approved.

BPM reconciliation messages are confirmation messages sent when a bag successfully completes part of the bag journey. For example, a BPM reconciliation message may be sent when a bag is correctly loaded onto or unloaded from an aircraft.

Embodiments of the invention provide an article scanning and tracking system using a multi-protocol API connected to a cloud platform via a network. Where the article is an item of baggage, the system can be used for remote baggage tracking, as further described below.

As shown in FIG. 1, a system 100 embodying the invention includes: a bag tag 101 associated with a bag 102 to form a tracked article 103; a mobile device 104; a cloud platform comprising an API Service 105, an API Data Processor 106, a Transform service 107, a Data Store 108, and a Baggage Information Message (BIM) Processor 109; and an Airline Departure Control System (DCS) 110. The mobile device 104 includes a mobile application for communicating with the API service. In preferred embodiments, the mobile device is a handheld wireless scanner which advantageously enables a user to scan items in locations without existing location tracking infrastructure.

During the check in process, the Airline DCS 110 sends messages 112 including passenger-related information to the BIM processor 109 and for storing in a data store as a passenger name record (PNR). Embodiments of the invention enable bag location information to be amalgamated with existing PNR data by sending messages 111 including bag location information from the mobile device 104 to the cloud platform via the API service 105, as further described below. A message 113 is generated including tracking information and passenger-related information and stored in data store 108. Providing the functionality of the API on a mobile application allows an airport to provide bag scanning and tracking functionality using a mobile device, thereby reducing the costs and infrastructure requirements for tracking a bag.

When a bag 102 is checked in, the airline generates a paper bag tag 101 which includes a license plate number (LPN) associated with the baggage article. The check-in event generates a Baggage Source Message (BSM) in the airline's Departure Control System (DCS) 110. The example BSM 112 shown in FIG. 1 is detailed below.

```
BSM
.V/1LATL
.F/XS1234/18APR/JFK/F
.O/XS5678/18APR/LHR/F
.N/0950457116001
.S/Y/3A/C
.P/COOPER/ANDREW
.L/2PKO3
ENDBSM
```

In the above example, the BSM 112 provides the following passenger-related information and instructions for ground handlers.

".V/1LATL" provides version information, including the source of the baggage article and the airport the BSM was generated at. In this example, the BSM 112 was generated at Atlanta airport and the bag 102 is local, i.e. it has not been transferred from elsewhere.

".F/XS1234/18APR/JFK/F" provides flight information, including flight number, the date of the flight, the destination airport and seat class. In this example, the bag 102 is associated with a passenger travelling on flight XS1234 on 18 April to John F. Kennedy International Airport with a First Class seat.

".O/XS5678/18APR/LHR/F" provides information relating to any onward or connecting flights, including the onward flight number, onward flight date, destination and seat class. In this example, the bag 102 needs to be loaded onto connecting flight XS5678 on 18 April to London Heathrow Airport.

".N/0950457116001" provides the bag tag information, which includes a 10 digit LPN and the number of articles checked in by the same passenger. In this example, the LPN is 0950457116 and only one bag 102 was checked in by the passenger.

".S/Y/3A/C" provides baggage reconciliation information, including whether a bag 102 is authorised to be loaded, the passenger's seat number and the passenger's status. In this example, the bag is authorised to be loaded onto the plane, the passenger has checked in and will be seated in seat 3A.

".P/COOPER/ANDREW" provides passenger name information.

Finally, ".L/2PKO3" provides passenger name record (PNR) address information.

The BSM 112 containing the above information is sent to the cloud platform via message routers from the Airline DCS 110 and is processed by a BIM Processor 109. The BIM processor 109 stores the baggage event in the cloud Data Store 108. Accordingly, the Data Store 108 contains a record of the information provided by the BSM 112.

After check-in, the bag tag 101 associated with the bag 102 may be scanned by the mobile device 104 at various scan locations. In some embodiments, the scan locations define points of interest on a bag journey. For example, a point of interest on a bag journey may be a plane-side loading point where baggage is stored before being loaded onto an aircraft.

Scanning the bag tag 101 with the mobile device 104 retrieves the LPN associated with the bag 102 from the bag tag 101. In preferred embodiments, the mobile application generates a message 111 including article information related to the bag and location information related to the current location of the bag and sends the message to the API service 105 via the network. Alternatively, the message 111 may be delivered to the API service 105 via WIFI, 3G, LTE or any other wireless connectivity means.

In preferred embodiments, the article information is electronically readable to enable the mobile device to obtain the article information. For example, article information may be obtained by scanning an article identifier. The article information included in the message 111 preferably contains the LPN which functions as a unique bag identity. Similarly, location information related to the current location of a bag may be obtained from a location identifier associated with a point of interest on a bag journey using the mobile device. In a specific example, the identifier may be a tracking location barcode placed at a key location during a bag journey which is scanned by the mobile device. For example, a location barcode may be placed next to each arrivals carousel.

An example format of a tracking location barcode is:
AAAEEEEEEEELLLLLLLLLLUCT

In the above example, "AAA" is an airport code. "EEEEEEEE" is an 8 character event type, which is passed to the API as "tracking_id." "LLLLLLLLLL" is a 10 character location, which is passed to the API as "tracking location." "U" is an instruction for an unknown bag. The instruction may be to ignore the unknown bag or to input flight data. "c" is a container input instruction. In some circumstances, a further barcode reading of a container ID is required after scanning a tracking point. "T" is the type of scan event to be performed. For example, the scan event may be loading or tracking.

In alternative embodiments, the identifier associated with a point of interest may be encoded in a short-range radio signal located at the point of interest.

Enabling the mobile device to scan the bag tag associated with a bag and the identifier associated with a point of interest enables accurate tracking information to be sent to the cloud platform API service 105 via an API payload. The example API payload 111 of FIG. 1 is detailed below.

```
{
    "service_id": "12"
    "airport_code": "ATL"
    "tracking_point_id": "PAXACC"
    "tracking_location": "BLOADFIV"
    "LPN": "0950457116"
    "timestamp": "2016-04-18T15:01:23.3Z
}
```

In the above example, "service_id" defines the unique identification number which may be associated with a particular third party such as a customer or contractor. Including "service_id" enables the system to verify that requests or calls to the cloud system are from a known source. "airport_code" defines the airport where the LWBIM was generated. In this example, the airport is identified as Atlanta airport. "tracking_point_id" defines the type of baggage handling event being recorded, and may be associated with a text descriptor. In this example, "PAXACC" may be matched against an internal event code, which indicates that a passenger has accepted the bag at baggage reclaim. "tracking_location" defines the location of where the scan occurred. The tracking location, "BLOADFIV" in this example, may be associated with a location descriptor, "B Load Five" in the present example, or GPS coordinates. "LPN" defines the license plate number and "timestamp" defines the time that the scan was made.

In alternative embodiments, location information could be GPS coordinates provided by a GPS module of the mobile device, or the location information could be manually input by a user.

The API payload 111 including the bag information may be sent to the cloud platform as a lightweight baggage information message (LWBIM). In a specific embodiment, the API payload 111 is a LWBIM in JavaScript Object Notation (JSON) message format, as shown in the example API payload 111 above.

The cloud platform identifies the LPN from the LWBIM 111 and enriches the payload using the API Data Processor 106. In specific embodiments of the invention, the API data processor 106 requests passenger-related information associated with the LPN contained in the LWBIM 111 from the PNR database in Data Store 108. If any passenger-related information is retrieved from the PNR database then the LWBIM is enriched with the passenger-related information by the API Data Processor 106. For example, the cloud platform may retrieve flight information or historical location information from the Data Store 108.

To enable compatibility with legacy systems, the enriched LWBIM is converted into a BIM 113 by Transform service 107. Thus, the BPM contains tracking information received via the API service and passenger-related information via an external system such as the baggage handling system. The cloud platform then processes and stores the BIM 113 as part of a message chain associated with the bag in Data Store 108. This enables the cloud platform to serve requests by parties for the status of the bag at a particular stage during a journey.

Including location information enables the cloud platform to cross-reference the scanned information with information located in a Data Store 108. The LWBIM 111 may then be augmented with additional related information retrieved from the Data Store 108. In some embodiments, the retrieved additional related information includes stored physical location data associated with this location for reporting within the mobile application.

As mentioned above, legacy Airline Systems typically use teletype format messages. If compatibility with legacy systems is required, the LWBIMs, which may be in JSON format, must be converted into a BIM in teletype format as further described below.

First, the API Service 105 accepts the LWBIM message 111 and sends it to the API Data Processor 106. Secondly, the API Processor 106 retrieves information associated with the baggage article 102, including flight information, from the Data Store 108. This is done by using the LPN information included in the LWBIM 111. The API Processor 106 enriches the LWBIM 111 with the data returned from the Data Store 108 and sends the enriched event to the Transform service 107. In a final step, the Transform service 107 transforms the JSON format LWBIM 111 into a teletype BPM 113. Thus, the BPM 113 generated by the Transform service 107 is compatible with external legacy systems and includes baggage location data and passenger information data. The BPM 113 is returned to the API Data Processor 106 and sent to the Data Store 108 to be stored as a new baggage event. BPMs are industry-standard messages which are used by numerous legacy airline systems, such as departure control systems and automated baggage handling systems. Generating a BPM including article location information therefore enables embodiments of the invention to provide article tracking data to existing legacy systems or other third parties.

The example BPM 113 generated by the Transform service of FIG. 1 is detailed below.

```
BPM
.V/1LATL
.J/R/45S/PAXACC/18APR/1501L/BLOADFIV
.F/XS1234/18APR/JFK/F
.U/AKE67890LH
.N/0950457116001
.O/XS5678/18APR/LHR/F
.P/COOPER/ANDREW
.L/2PKO3
ENDBPM
```

The API data processor matches the LPN provided by the LWBIM 111 with the LPN associated with known passenger-related data detailed in the BSM 112 sent by the baggage handling system. The Transform service 107 is therefore able to include incoming and onwards flights details, if such details exist, into the BPM. The .J element includes tracking data gathered by the mobile application and sent via the LWBIM 111, such as "tracking_id" and "tracking_location." The BPM 113 may also include a container identifier, if such data has been collected, in the .U element (not shown in FIG. 1). In the above example, the container is identified as "AKE 67890 LH".

In some instances, the API Data Processor 106 is unable to retrieve passenger related data from the data store 108 as there is no BSM associated with the particular LPN. This situation may occur if a particular airline has a problem with their network, or if smaller airports do not have access to the baggage handling systems. If passenger related data cannot be retrieved, then the mobile application will issue a prompt for the passenger related data, such as flight number and date of travel, to be entered manually as further described below.

Once written to the Data Store 108, the well-known concept of shadowing may be used to accumulate all the tracking data associated with a bag 102.

A 'shadow' is a software copy of the physical bag tag containing a store of all historical data associated with the bag tag. The shadow may be stored in a cloud-based database and persists even if the system software crashes. The shadow can be replicated for use across different operating systems or hubs. The shadow may be queried to identify a particular bag tag and can return any historical data concerning the baggage article associated with that bag tag, including the most recent location data and LPN.

The shadow therefore contains a full history of the bag's tracked location. A location tracking system could therefore interrogate the shadow, extract the stored tracking data associated with a bag and present the data to a user in a meaningful way.

In an embodiment, the mobile application may send a notification to a passenger when a bag arrives at a specific location. For example, a notification may be sent when the bag arrives at a holding area to await being loaded onto an aircraft. The notification may include information relating to the bag's location and the time of arrival at that location. The notification may also include other information such as passenger details, the flight number and final destination.

Further aspects of the invention may be embodied in a mobile application for use in the above described system. Embodiments of the invention enable the mobile application to create API payloads 111 including bag information and send the API payloads 111 to cloud platform API service 105. Embodiments of the invention also enable the mobile application to query the cloud platform about a bag's location history. In preferred embodiments, the mobile application is loaded onto a mobile device 104 having a scanning module and, in specific embodiments, the scanning module is a camera.

FIGS. 2 to 14 show an example graphical user interface (GUI) for a mobile application which may record and retrieve baggage tracking information.

Figure 2:
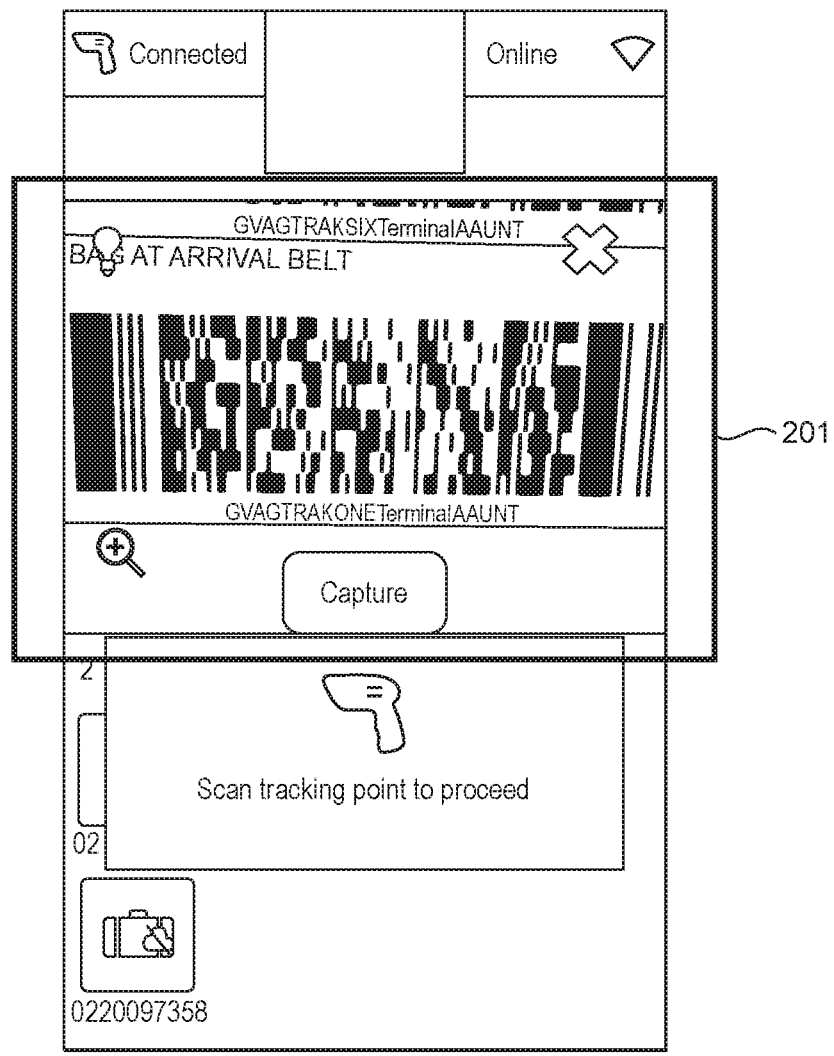
FIG. 2 shows an example graphical user interface (GUI) displaying a location barcode preview.
Figure 3:
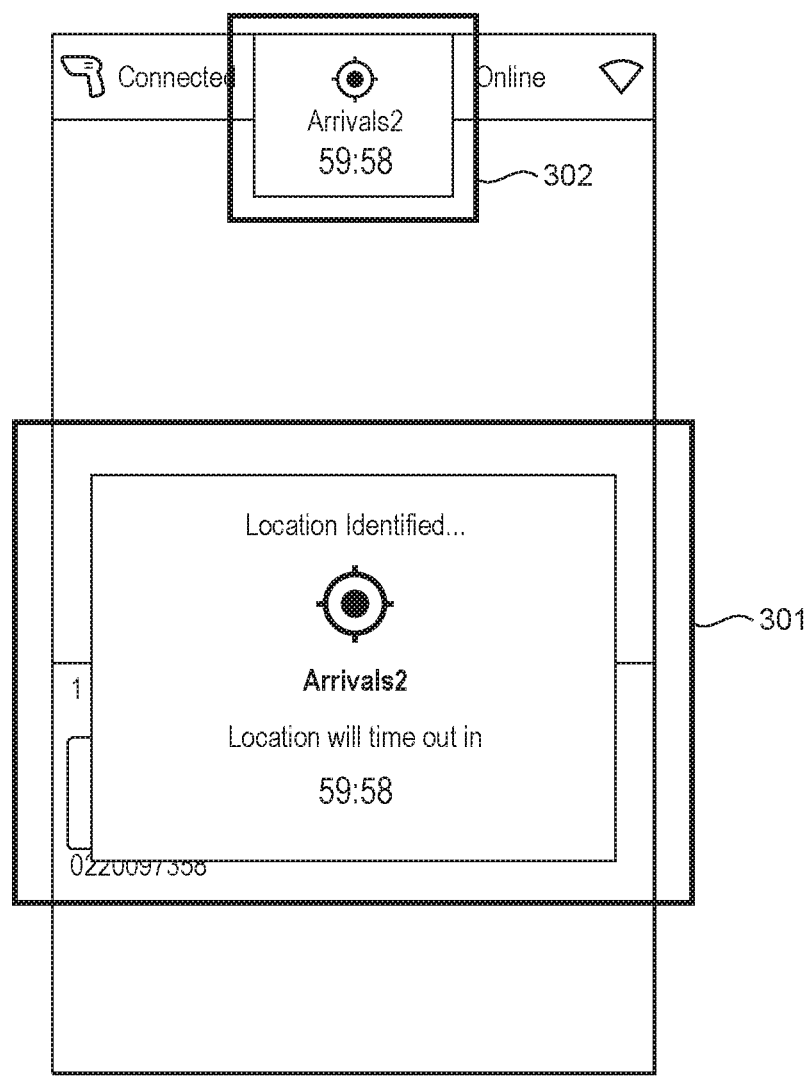
FIG. 3 shows an example GUI displaying a location notification.
Figure 4:
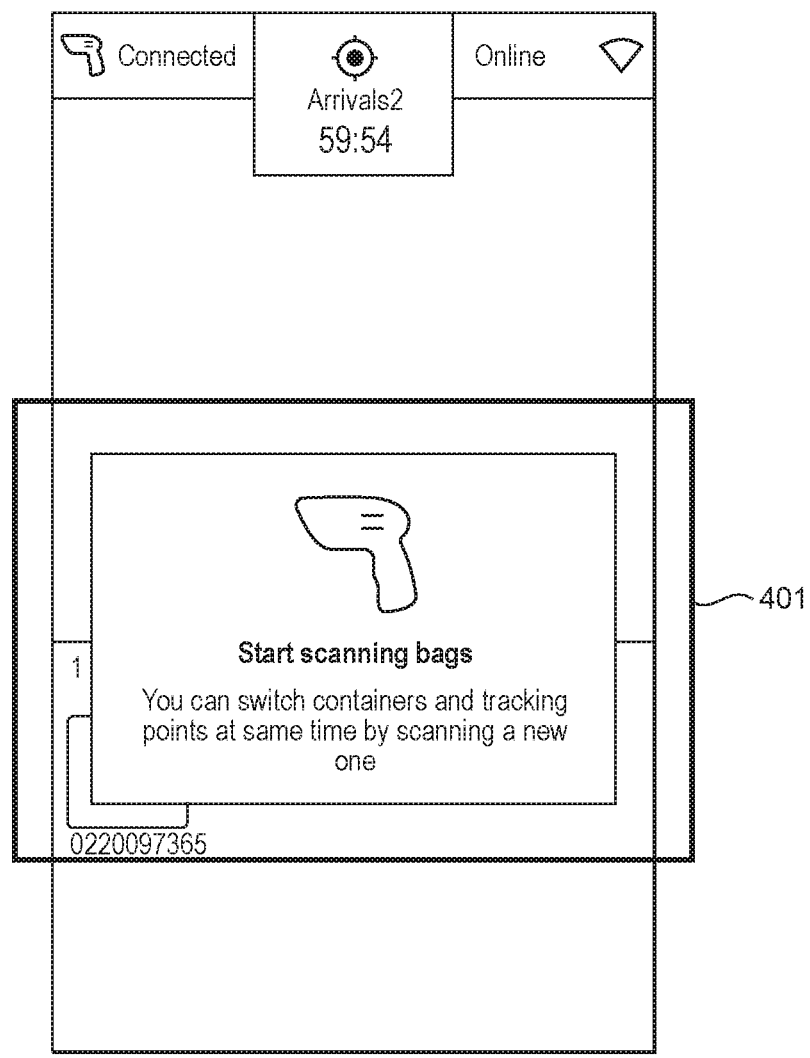
FIG. 4 shows an example GUI displaying a notification that a user may begin obtaining article information by scanning an article identifier.

To record bag location data, the mobile application prompts a user to enter a location. In some embodiments, the bag location may be entered by scanning a tracking point identifier, as shown in FIG. 2. In this case, the GUI displays a preview of the tracking point identifier, as viewed by the scanning module, to enable a user of the mobile application to successfully scan the tracking point identifier.

In the embodiment shown in FIG. 2, the tracking point identifier is a 3 dimensional barcode 201. However, in alternative embodiments, the location information may be provided by any other suitable means, for example receiving a payload from a Bluetooth 0 beacon, scanning an RFID, or obtaining the current GPS coordinates of the mobile device.

Scanning the tracking point identifier provides the mobile application with location information for associating with a bag to be scanned. If the mobile device successfully identifies the current location, a notification 301 may be displayed by the GUI. In the example shown in FIG. 3, the GUI identifies the current location as arrivals belt "Arrivals2." Displaying text descriptor of the current location may enable a user to quickly identify whether the scanned location correctly corresponds to their current location. The text descriptor may also be used as a placeholder for more detailed location information, such as GPS coordinates, by the cloud platform.

Once identified, the location information is valid for a limited period of time. In the example shown in FIG. 3, the location information is valid for approximately one hour. Any bag that is scanned within this time period will be associated with the current location, "Arrivals2." The GUI displays an indicia 302 indicating the current location and the time remaining before the location information needs to be updated. Validating the location information for a limited period of time beneficially prevents a user from continually re-entering location information, while also preventing the application from retaining old location data, which may no longer be accurate.

Figure 5:
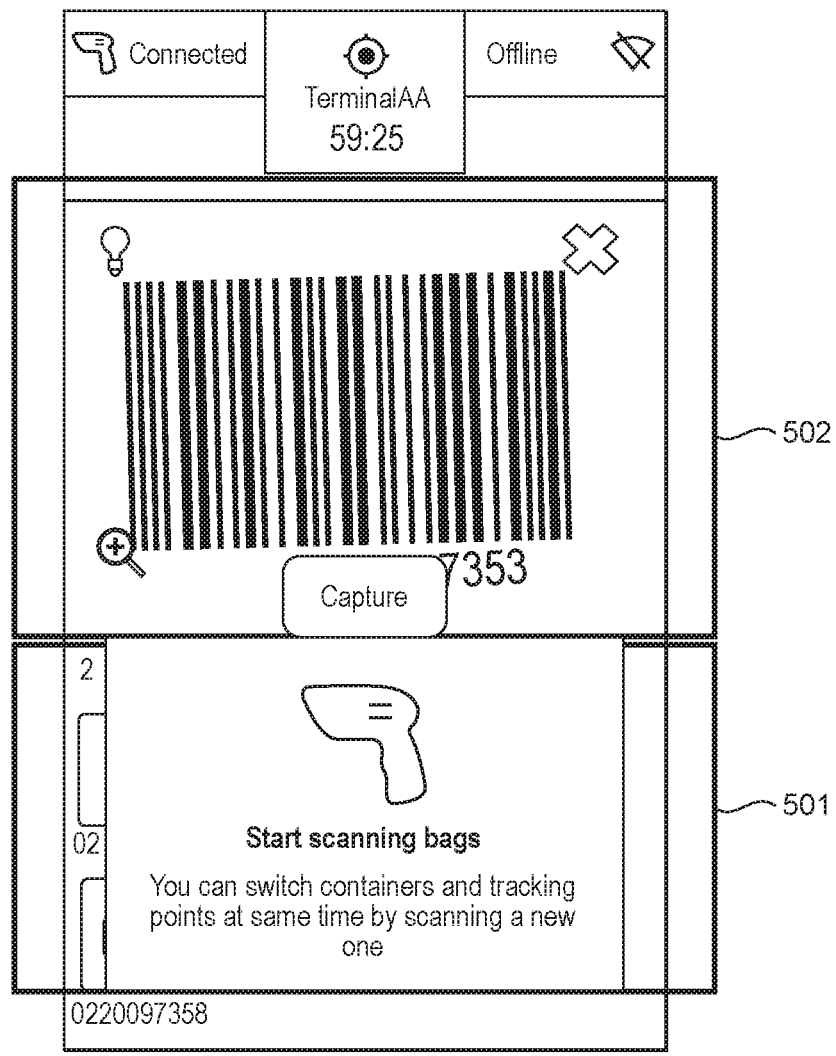
FIG. 5 shows an example GUI which displays a scanner preview window in addition to the notification that a user may begin scanning an article identifier.

Once the mobile application has been provided with valid location information, the scanning module of the mobile device scans a bag tag 101 associated with a bag 102. In the examples shown in FIGS. 4 and 5, the GUI may issue a notification 401 that a user may begin scanning bag tags. As shown in the example of FIG. 5, the GUI may display the notification to begin bag scanning 501 simultaneously with a scanner preview window 502 for enabling a user to align the scanner with a location identifier.

If a bag is known to the baggage handling system then the cloud platform may retrieve passenger-related information associated with the LPN of a particular bag from a BSM issued by the departure control system (DCS). There is therefore no requirement for a baggage handler to input the flight details for every bag that they process, hence advantageously saving time.

In some embodiments, the mobile application will be configured to request additional flight-related information. This may occur if passenger-related information associated with the baggage article being scanned cannot be retrieved, which occurs when the cloud platform does not contain a record of a BSM associated with a particular bag.

Figure 6:
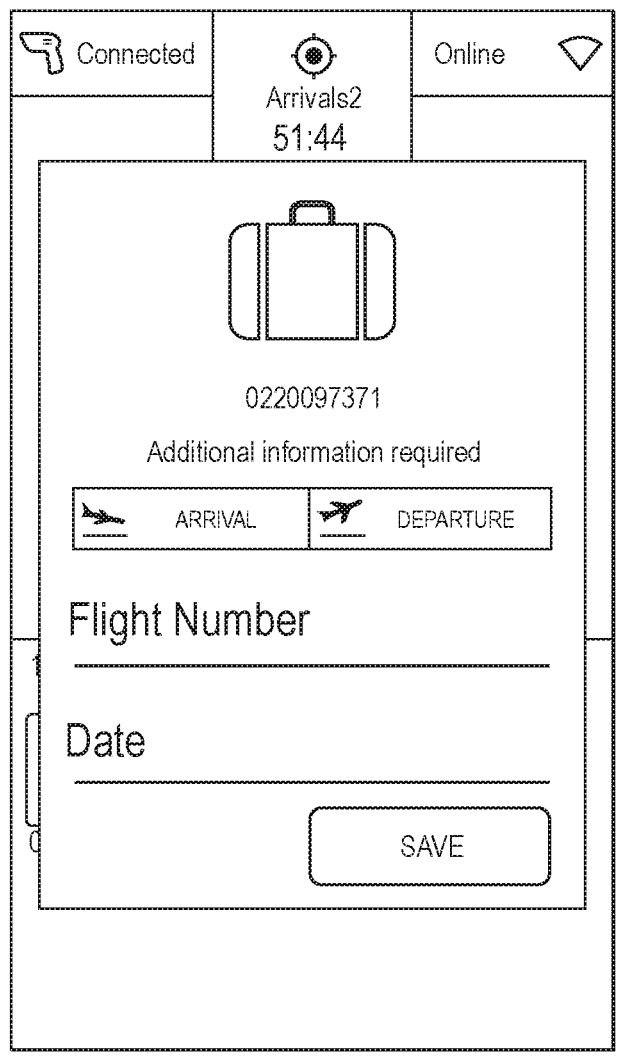
FIG. 6 shows an example GUI which displays a request for additional information related to the article being scanned.
Figure 7:
FIG. 7 shows the example GUI of FIG. 6, including additional information related to the article being scanned.
Figure 8:
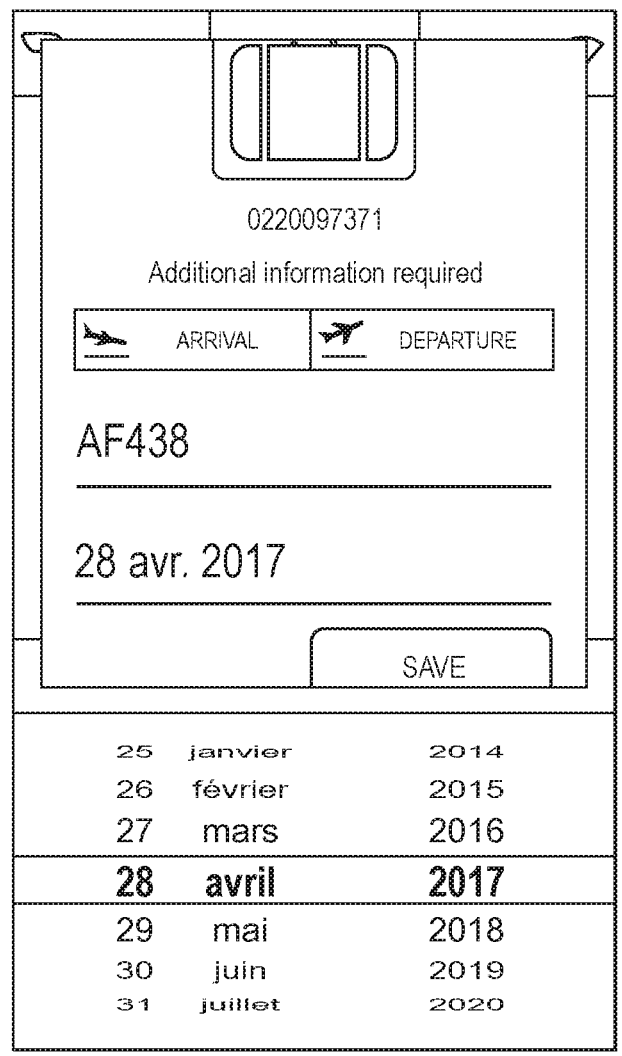
FIG. 8 shows the example GUI of FIGS. 6 and 7, including further additional information related to the article being scanned.

In that case, the mobile application detects that a bag is unknown on scanning the bag tag and will display a request for additional passenger-related information, as shown in the example of FIGS. 6 to 8. This step is only required when there is no record of the bag in the cloud platform. In the example shown in FIG. 6, the additional passenger-related information is the flight number and date of travel. FIGS. 7 and 8 show how the user may provide this information to the GUI. However, the additional information requested by the GUI may not always be passenger related. In some embodiments, the GUI may request more specific location information, for example if the baggage may be loaded into a choice of loading containers the GUI may issue a prompt to scan the unique identifier associated with the particular loading container.

The mobile application retains the manually inserted location information and additional flight-related information and associates that information with the LPN associated with any unknown bags. In the example shown in FIG. 9, three unknown bags have been provided with the same location and flight-related information, namely flight number AF438 to Geneva Airport on 28 Apr. 2017. Each scanned bag may be represented by a bag icon 901 which indicates the LPN associated with the bag to enable a user to distinguish between scanned bags and to correctly select a particular bag.

Figure 9:
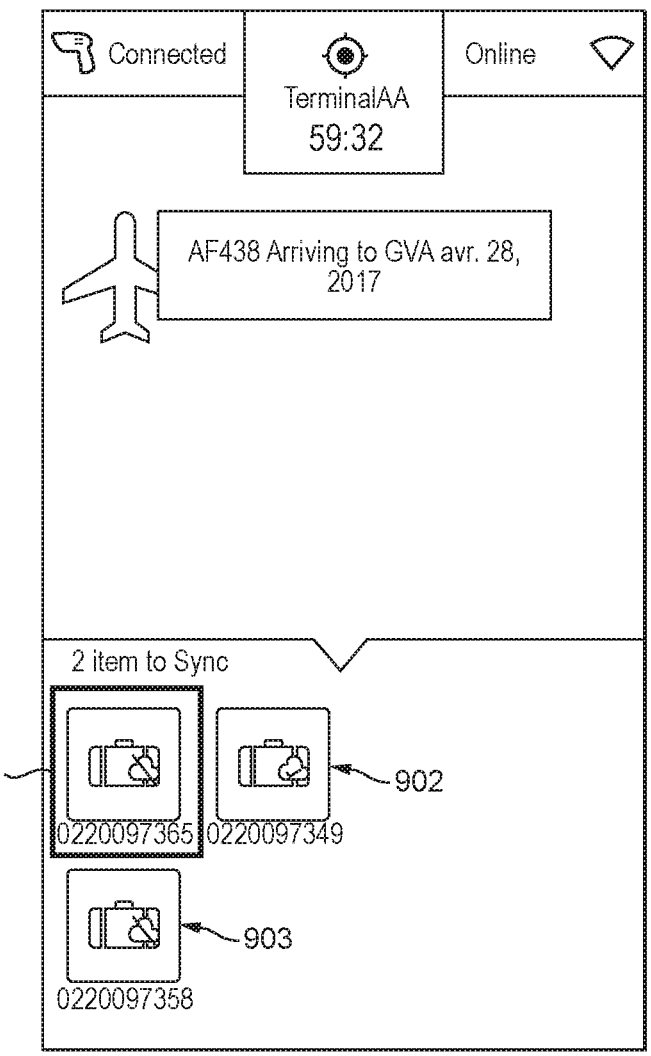
FIG. 9 shows an example GUI which displays scanned articles that have been provided with the additional information of FIG. 8.

Once the mobile application has acquired the above bag information, the mobile application generates an API payload 111 including the bag information and attempts to send the API payload to the API service 105 via a network. As shown in FIG. 9, the GUI may indicate whether the payload 111 has been successfully uploaded to the API service 105 by marking the bag icon associated with the bag with a tick 902. If the mobile application has been unable to upload the information associated with the bag, then the relevant bag icon is marked with a broken cloud 903. Failure to upload the bag information may be due to an error synchronising the bag data with the server. If a record of the LPN associated with the bag already exists in the cloud platform then the API data processor 106 may retrieve passenger-related data associated with the LPN and generate a BPM from the bag information obtained from the API payload 111 and the retrieved passenger-related data.

Figure 10:
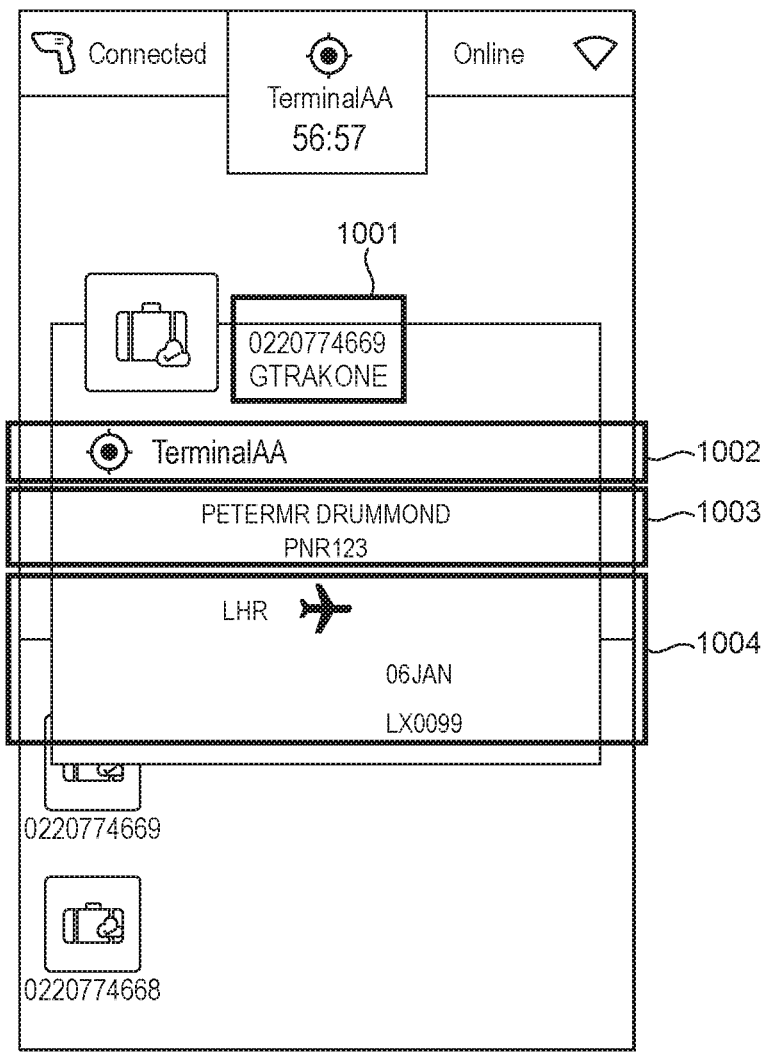
FIG. 10 shows an example GUI which displays information associated with a first article.
Figure 11:
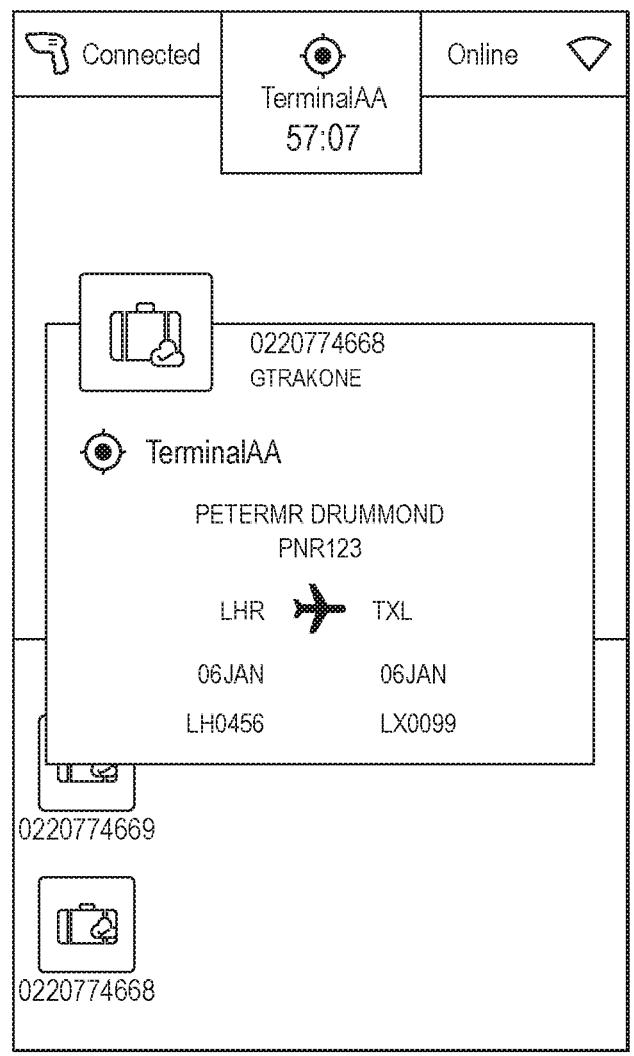
FIG. 11 shows an example GUI which displays information associated with a second article.
Figure 12:
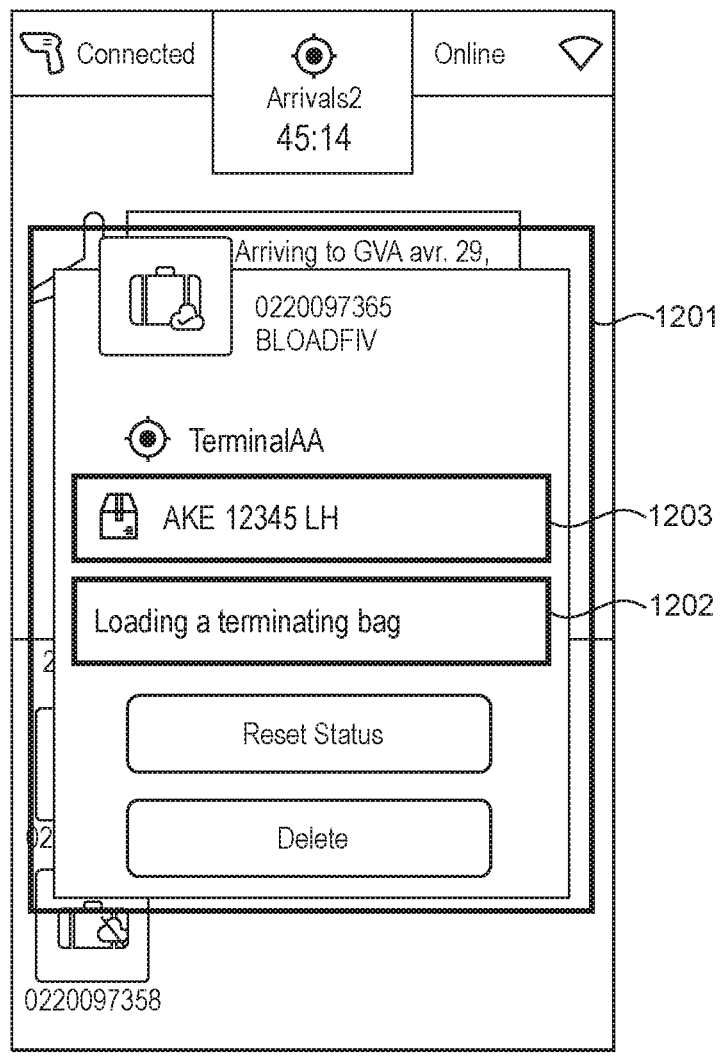
FIG. 12 shows an example GUI which displays information associated with a third article.

As shown in FIGS. 10 to 12, the GUI may display information associated with a particular bag when a user taps on the relevant bag icon 901. In a first example shown in FIG. 10, the GUI displays information including the LPN and tracking location 1001, most recent location data 1002, passenger name data 1003, and flight-related data 1004. In this example, the GUI indicates that the LPN associated with the bag is 0220774669, the most recent location of the bag is "GTRAKONE", which is situated in TerminalAA, the bag is associated with Mr Peter Drummond, and the bag will be travelling on flight LX0099 on 6 January. In a second example shown in FIG. 11, the GUI indicates that the LPN associated with the bag is 0220774668, the most recent location of the bag is "GTRAKONE" in TerminalAA, the bag is associated with Mr Peter Drummond, the bag has previously traveled on flight LH0456 on 6 January and will be travelling on flight LX0099 on 6 January.

If an error occurs during bag scanning, an error message is displayed by the GUI. In the example shown in FIG. 12, the error message 1201 includes text 1202 indicating that the bag is a terminating bag and should not be loaded onto the plane. The example shown in FIG. 12 also includes current location information 1203 which indicates the container that the bag has been loaded into. In the specific example shown in FIG. 12, the bag is loaded into container "AKE 12345 LH."

Figure 13:
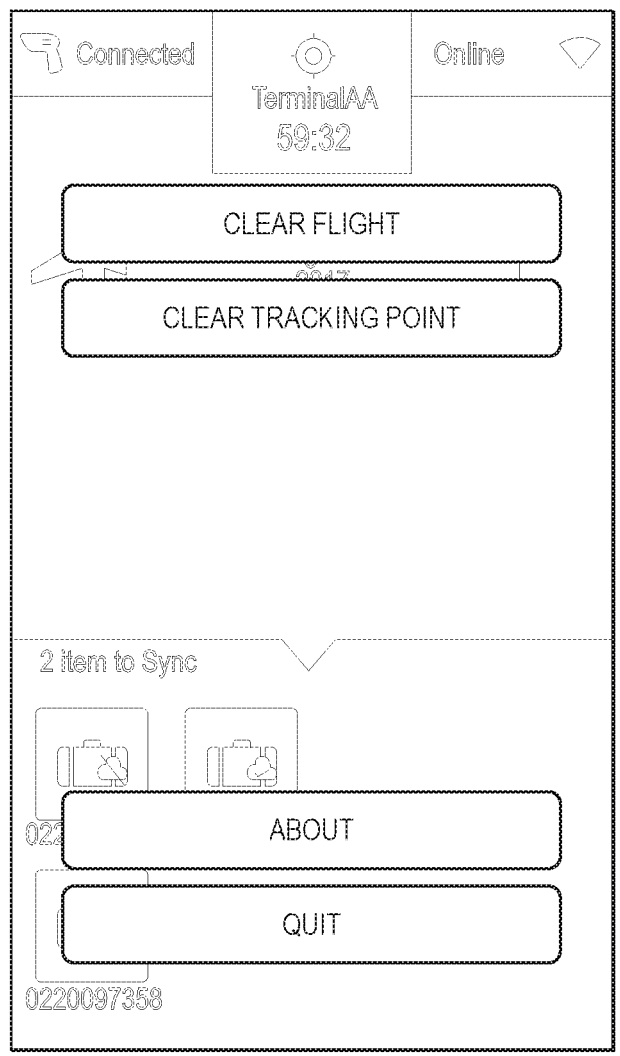
FIG. 13 shows an example GUI which displays options to clear data stored by the mobile application.

The mobile application may enable a user to clear the location or flight information that is associated with each scanned bag at any time, as shown in FIG. 13. This enables a baggage handler to associate new location and flight information for bags associated with a different flight. These options may be accessed from a menu on the GUI.

The mobile application described above has the advantage of only requiring minimal data to be captured for a bag to be successfully recorded by a back end database.

Embodiments of the invention may be used to perform 'bingo sheet' scanning. Here, a plurality of bag tag bar codes are stuck to a sheet of paper and all the bag tags can be recorded in a single scan. Thus, the steps of generating a message by combining the article information with the location information; b. applying a timestamp to the message; and c. transmitting the timestamped message via a transmitter of the mobile device; can be performed sequentially for a plurality of bag tags in a very short time in a single scanning action.

The mobile application GUI described above has the advantage of having a minimalist design, enabling a handling agent to focus on moving and scanning bags without needing to input manual data, apart from in exceptional circumstances, as there is no need to navigate into menus or complex settings. Embodiments of the invention are not specific to any one airline or airport hardware and software system and can therefore be used with any airline or airport system without requiring further customisation.

The above systems and methods may be used to enable a user to upload bag location information to a cloud platform, but may also be used to retrieve information from the cloud platform. For example, the mobile application can retrieve a status summary for the bags associated with a particular flight. Entering a particular flight number, for instance flight number "BA078", would result in obtaining status information for the bags associated with that flight. This may be achieved by sending an API request for the relevant flight and location data stored in data store 108 associated with that flight number. The status summary may provide the number of bags check in for the flight, the number of transfer bags received from other carriers which are due to be loaded onto the flight, the number of bags loaded onto containers due to be loaded into the aircraft, and the number of bags already loaded into the aircraft. This advantageously enables bag handlers to know whether any more bags are expected at any given time.

The mobile application can also be used to retrieve information associated with a particular bag, as described below with reference to the schematic workflows of FIGS. 14 and 15.

FIG. 14 shows an example schematic workflow 1400 for a member of airport staff querying the location of a particular bag using the mobile application.

In a first step 1401, a location identifier is scanned by a baggage handler. In this example, the location barcode is located at a first airport and is associated with a point of interest on a bag journey. In the specific example shown in FIG. 14, the location identifier is a barcode located at a plane-side loading point. In a second step 1402, a bag tag is scanned by the baggage handler. As before, scanning the bag tag retrieves an LPN associated with the bag. The LPN and bag location information are amalgamated and sent to the cloud platform as described above. In a third step 1403, the bag status is queried by staff at the destination airport. In this example, a passenger's bag may have been sent to the wrong destination. When arriving at their destination airport, which may be different to the first airport, the passenger may ask a member of staff at the destination airport the current location of their bag. The member of airport staff at the destination airport may use the mobile application to request the location information using the passenger's LPN or other passenger-related data. In a final step 1404, the bag event history is shown, with most recent event being the bag loaded onto the plane. The cloud platform database may return additional information relating to the last known scan location, including a text descriptor of the scan point, the latitude and longitude GPS coordinates of the scan location, and the scan time. In this example, the member of staff would be able to use the mobile application and tracking system to provide some peace of mind to the passenger by correctly informing them that their bag has been loaded onto the next flight to the destination airport.

FIG. 15 also shows an example schematic workflow 1500 for a member of airport staff querying the location of a particular bag using the mobile application to inform a passenger of their bag status.

In a first step 1501, a passenger complains their bag has not appeared on a carousel. In this example, a passenger's bag may have arrived at the destination airport, but may have been misplaced on the way to the arrivals bag carousel. In a second step 1502, staff query the database using bag tag data. The airport staff may use the mobile application to search for bag location information associated with an LPN, or other passenger-related data. In a third step 1503, staff can report last bag event, to confirm if the bag has been lost, or is still being unloaded, etc. In this example, the member of staff would be able to use the mobile application and tracking system to provide current information to the passenger. This provides a degree of certainty to the passenger so that they may either continue to wait to reclaim their bag, or to notify another member of staff that their bag is lost.

Embodiments of the invention have the advantage of improving on currently available systems by simplifying the process of "on-boarding" tracking services at locations currently not served with adequately required infrastructure, as well as locations who wish to extend their tracking capabilities at significantly reduced cost and effort. It also provides the advantage of creating more "portable" tracking opportunities due to the light-weight nature of the interface and numerous network connectivity options. A further advantage is that the claimed invention interfaces with legacy technology. This allows "modern" aspects of the network, such as mobile-based scanning, to interface with existing legacy infrastructure and to make use of the information within the legacy systems.

In the air transport industry, there is a well measured anxiety about the possibility of checked baggage being lost, stolen, delayed, or damaged. Although these eventualities are rare, passengers remain unaware of the precise location and status of their baggage throughout much of their journey. Embodiments of the invention therefore have the advantage of reassuring passengers that their baggage has been processed properly by sending baggage status notifications to a passenger through a mobile application.

In another embodiment, the API Data Processor 106 may also send the generated BPM 113 to baggage handling systems or other systems storing passenger information. Sending BPMs to baggage handling systems enables embodiments of the invention to effectively communicate data associated with tracking a baggage article to existing systems.

The above detailed description of embodiments of the invention are not intended to be exhaustive or to limit the invention to the precise form disclosed. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. As indicated above, the invention enables tracking an article in any large venue, including, but not limited to, shopping centres, sports stadia, commercial premises, academic institutions and performance venues. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure.

The invention claimed is:

1. An article tracking system using a mobile device comprising:
an article identifier for providing electronically readable article information associated with an article to one or more external legacy systems configured to access messages in a teletype format, the article information including a unique article identity and configured to be scanned by the mobile device;
a location identifier for providing location information related to a current location of the article to the one or more external legacy systems;
a mobile application stored on the mobile device, the mobile application configured to:
  a. receive GPS coordinates from a GPS module of the mobile device by scanning the location identifier with the mobile device;
  b. in response to receiving the GPS coordinates, generate an API payload comprising the article information and the GPS coordinates, wherein the API payload comprises a lightweight baggage information message in a format unsupported by the one or more external legacy systems;
  c. apply a timestamp to the API payload; and
  d. transmit the timestamped API payload via a transmitter of the mobile device;
a tracking database configured to receive and store a plurality of timestamped API payloads, thereby to record multiple locations of the article over time; and
a cloud platform configured to transform the API payload into a teletype baggage processed message format compatible with the one or more external legacy systems to access the GPS coordinates.

2. The article tracking system of claim 1, wherein the cloud platform comprises the tracking database that receives and stores the timestamped API payload at a remote location.

3. The article tracking system of claim 2, wherein:
the cloud platform is configured to:
  retrieve user information associated with a user from the one or more external legacy systems via a data processor;
  transform the API payload into a same format as the user information with a transform service, wherein transforming the API payload enables compatibility of the article identifier with the one or more external legacy systems;
the user information includes:
  passenger related data retrieved from a passenger name record database, and
  the unique article identity of an article associated with the user;
the data processor is configured to use the unique article identity to enrich the API payload with the retrieved user information; and
the transform service transforms the message into teletype message format.

4. The article tracking system of claim 1, wherein user information associated with a user is manually input.

5. The article tracking system of claim 1, wherein the article is a baggage article.

6. The article tracking system of claim 1, wherein the article identifier is a bag tag, an RFID or a BLE beacon.

7. The article tracking system of claim 1, wherein the location identifier is a bar code or the GPS module.

8. An article tracking method using a mobile device comprising the steps of:
  a. associating an article identifier with an article;
  b. obtaining, via a mobile application stored on the mobile device, electronically readable article information including a unique article identity from the article identifier, wherein the article information is configured to be provided to one or more external legacy systems configured to access messages in a teletype format ;

c. receiving GPS coordinates from a GPS module of the mobile device by scanning the location identifier with the mobile device;

d. in response to receiving the GPS coordinates, generate an API payload comprising the article information with the GPS coordinates, wherein the API payload comprises a lightweight baggage information message in a format unsupported by the one or more external legacy systems;

e. applying a timestamp to the API payload;

f. transmitting the timestamped API payload via a transmitter of the mobile device;

g. receiving and storing the timestamped API payload at a tracking database;

h. transforming the API payload into a teletype baggage processed message format compatible with the one or more external legacy systems to access the GPS coordinates; and i. repeating steps b to h for a plurality of locations, thereby to record multiple locations of the article over time.

9. The article tracking method of claim 8, wherein the API payload is transmitted via at least one of: WiFi, 3G, and LTE.

10. The article tracking method of claim 8, wherein the mobile device is a handheld wireless scanner.

11. The article tracking method of claim 8, further comprising storing a software copy of historical tracking data associated with a bag tag on a cloud platform.

12. The article tracking method of claim 11, wherein the historical tracking data associated with the bag tag includes the most recent location data and LPN associated with the bag tag.

13. The article tracking method of claim 8, further comprising:

querying a software copy of historical tracking data and extracting stored tracking data, and presenting the extracted data to a user.

14. An article tracking system using a mobile device comprising:

an article identifier for providing electronically readable article information associated with an article to one or more external legacy systems configured to access messages in a teletype format, the article information including a unique article identity and configured to be scanned by the mobile device ;

a location identifier for providing location information related to a current location of the article at each of a plurality of locations to the one or more external legacy systems;

a mobile application stored on the mobile device, the mobile application configured to:

a. receive GPS coordinates from a GPS module of the mobile device by scanning the location identifier with the mobile device;

b. in response to receiving the GPS coordinates, generate an API payload comprising the article information and the GPS coordinates, wherein the API payload comprises a lightweight baggage information message in a format unsupported by the one or more external legacy systems;

c. apply a timestamp to each of the generated API payloads; and d. transmit the timestamped API payloads via a transmitter of the mobile device;

a tracking database configured to receive and store the plurality of timestamped API payloads, thereby to record locations of the article over time ; and a cloud platform configured to transform the API payload into a teletype baggage processed message format compatible with the one or more external legacy systems to access the GPS coordinates.

15. The article tracking system of claim 14, wherein the mobile application requests the current location to be manually input.

16. The article tracking system of claim 14, wherein the location information includes a unique location identity.

17. The article tracking system of claim 14, wherein the cloud platform comprises the tracking database that receives and stores the timestamped API payload at a remote location.

18. The article tracking method of claim 8, further comprising enriching the API payload with passenger-related information via an API data processor.

19. The article tracking system of claim 3, wherein the cloud platform is configured to transform the API payload into a teletype message format readable by the one or more external legacy systems to access the GPS coordinates and the article information, wherein transforming the API payload enables compatibility of the article identifier with the one or more external legacy systems.

* * * * *